United States Patent
Yuan et al.

(10) Patent No.: US 6,219,205 B1
(45) Date of Patent: Apr. 17, 2001

(54) HIGH DENSITY GIANT MAGNETORESISTIVE TRANSDUCER WITH RECESSED SENSOR

(75) Inventors: Samuel W. Yuan, Sunnyvale; Robert Earl Rottmayer, Fremont, both of CA (US)

(73) Assignee: Read-Rite Corporation, Milpitas, CA (US)

( * ) Notice: Subject to any disclaimer, the term of this patent is extended or adjusted under 35 U.S.C. 154(b) by 628 days.

(21) Appl. No.: 08/541,441

(22) Filed: Oct. 10, 1995

(51) Int. Cl.[7] .................................................. G11B 5/39
(52) U.S. Cl. ................................................ 360/319
(58) Field of Search ...................... 360/113; 338/32 R; 324/252

(56) References Cited

U.S. PATENT DOCUMENTS

| | | | |
|---|---|---|---|
| 4,639,806 | * | 1/1987 | Kira et al. ............................... 360/13 |
| 4,807,073 | * | 2/1989 | Takeura et al. ...................... 360/113 |
| 5,168,408 | * | 12/1992 | Lazzari ................................. 360/113 |
| 5,446,613 | * | 8/1995 | Rottmayer ........................... 360/113 |

* cited by examiner

Primary Examiner—William R. Korzuch
(74) Attorney, Agent, or Firm—Nathan N. Kallman

(57) ABSTRACT

A magnetic transducer employs a giant magnetoresistive sensor whose sensing surface is separated by a dielectric layer from a magnetically recorded surface carrying recorded data signals to be read back by the transducer. The dielectric layer serves to protect the sensing layer from corrosion, electrostatic discharge from the record surface, mechanical damage from asperities, thermal asperities from heating resulting from close contact between the transducer and the record surface, and damage from exposure during lapping operations. This structure also reduces the readback pulse width and offtrack assymmetry, and improves servo linearity, thereby increasing recording density. The reduced signal amplitude is compensated for by the use of a giant magnetoresistive transducer with an intrinsically large output. The use of the recessed transducer reduces saturation of the transducer due to the record medium flux at reduced signal amplitudes, thereby increasing readback efficiency.

6 Claims, 2 Drawing Sheets

HIGH DENSITY GIANT MAGNETORESISTIVE TRANSDUCER WITH RECESSED SENSOR

CROSS-REFERENCE TO RELATED APPLICATION

Copending application Ser. No. 08/509,118, filed Jul. 31, 1995 for "Method And Apparatus For Controlling The Lapping Of Magnetic Heads", assigned to the same assignee as the present application, discloses and claims the detection of the sensing surface of a magnetoresistive (MR) sensor in an MR transducer structure by applying a magnetic field to the structure and detecting the changing electrical response of the sensor to the magnetic field as the transducer structure is lapped during manufacture.

FIELD OF THE INVENTION

This invention relates to magnetic transducers employing giant magnetoresistance (GMR) and in particular to a shielded GMR transducer.

DESCRIPTION OF THE PRIOR ART

As magnetic recording devices such as disk drives evolve towards ultra-high areal recording densities of 1 $GB/in^2$ (gigabytes per square inch) and beyond, the requirements for the linear bit density and track density capabilities of the recording head becomes increasingly more stringent. Narrow read gap length and track width are necessary to satisfy these requirements.

Because MR sensors are somewhat fragile and hence susceptible to mechanical, chemical and electrical damage during fabrication and assembly, there have been efforts to dispose such sensors in a recessed location in a transducer so as to be physically separated from the extension of the transducer. Since such a recessed location was believed to result in a reduction in the magnetic flux reaching the sensor, flux guides have been suggested to increase the amount of flux available at the sensing surface of the sensor. Such flux guide structures are described in the publication entitled *The Study Of Recessed MR Sensors With Un-Laminated and Multi-Laminated Flux-Guides,* C. Tsang et al, presented at the 1992 Intermag Conference, New Orleans, April 1992, and also described in the references identified in that publication. In that publication, a single-layer flux guide used therein has significant domain activity, leading to undesirable Barkhausen head noise. A more complicated multi-layer lamination flux guide is required to solve this problem, but even with this measure, an additional 40% signal loss is introduced by the fluxguide.

In another prior art approach a hard carbon overcoat is applied to the air bearing surface of the transducer to protect the sensor material and improve the head/disk wear and head flying properties. However, such an overcoat increases the head/disk spacing and can lead to signal amplitude loss and pulse widening, thereby reducing the signal-to-noise ratio, the detectable flux changes per inch and the tracks per inch.

SUMMARY OF THE INVENTION

The present invention utilizes a shielded read transducer with a GMR sensor, either a spin-valve device or a multi-layer device, recessed from the air bearing surface of the transducer. The recessed gap area is filled with a dielectric material which can be identical to the dielectric material in the gaps of the sensor itself. The present invention eliminates the problems described above with prior art transducers and compensates for any signal loss resulting from the space between the sensor and the ABS when using GMR sensors. Current GMR development provides sensors with very large sensitivity, and the present invention takes advantage of this feature to achieve a high data recording density. GMR materials can be vulnerable to corrosion damage, but the dielectric layer used herein effectively protects the sensor.

The structure of this invention has the following advantages:

(1) The presence of the recess reduces or prevents electrostatic discharge (ESD) between the active portion of the sensor and the disk. The structure also reduces contact with thermal asperities on the disk, especially during low-flying of the air bearing slider and transducer or contact of the transducer relative to the rotating disk or medium. Additionally, the structure protects the sensor materials, such as FeMn or TbCo, from corrosion, and protects the sensor materials from lapping exposure and contact with air.

(2) Read head saturation is reduced and the sensor is maintained in a linear dynamic range resulting from a reduction of flux in the transducer.

(3) The $PW_{50}$, which is a measure of the readback pulse width at 50% amplitude, is reduced from that produced in a non-recessed head, thereby achieving a higher linear readback density.

(4) The structure also results in improved off-track symmetry, thereby reducing cross-talk and improving servo linearity by reducing incoming longitudinal flux.

DESCRIPTION OF THE PREFERRED EMBODIMENT

Figure 1:
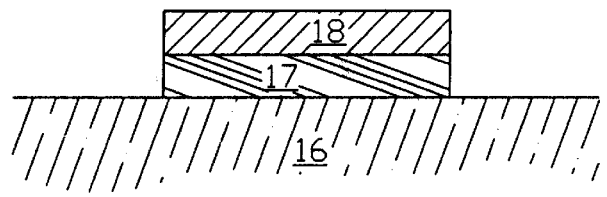
FIGS. 1 and 2 are planar cross-sectional views showing steps in the fabrication of a transducer in accordance with the present invention.

FIG. 1 illustrates a first step in fabricating a transducer in accordance with the present invention. A bottom shield member 16, formed of a suitable magnetic material such as Sendust, NiFe or or an amorphous Co alloy, has a layer 17 of a dielectric material such as $Al_2O_3$ or $SiO_2$ deposited thereon. A GMR layer 18 is then placed on layer 17 and processing is performed to define the height of the GMR stripe 18. GMR element may be a multilayer structure as described below in connection with FIG. 4. This portion of the processing may be performed by photolithography or focused ion beam etching, the latter technique having a resolution of 0.1 µm (micrometers).

Figure 2:
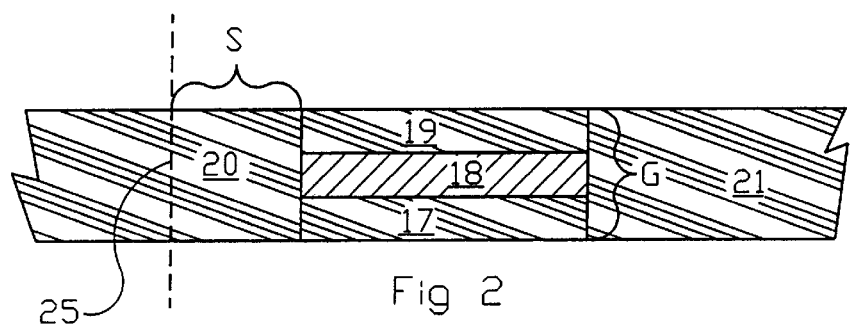

As shown in FIG. 2, processing continues by depositing an additional dielectric layer 19 on top of GMR element 18 and depositing further portions 20, 21 of dielectric material on the front and the back of the structure. Dielectric portions 20, 21 may be of the same type of material as dielectric layers 17, 19. Layers 17, 19 form the gaps for the transducer.

Figure 3:
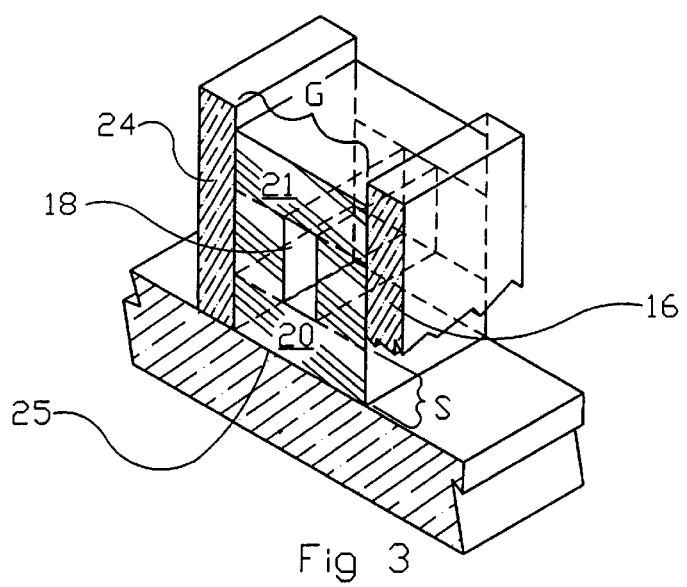
FIG. 3 is an isometric view, partly in cross-section, showing the structure of the transducer of this invention.

The end of front dielectric portion 20 may then be etched away to produce a remaining length S, length S (also shown in FIG. 3) representing the recession distance of the sensing surface of sensor 18 from a surface 25 bearing recorded magnetic signals to be read. Distance S is preferably in the range of 500–1250 Å. A top shield member 24 (FIG. 3) of magnetic material similar to the material of bottom shield 16 is then added. The sensor recession distance S must be greater than 500 Å to ensure electrical insulation between the GMR sensor and surface 25 which will become the air bearing surface. Recession distance S must also be smaller than half the spacing G between the edges of shields 16, 24 to prevent significant signal loss caused by the shields shunting away incoming magnetic transition flux from the recording medium. FIG. 3 shows this structure as oriented toward surface 25, with the sensing surface of GMR element 18 separated from surface 25 by the thickness S of dielectric material 20.

Figure 4:
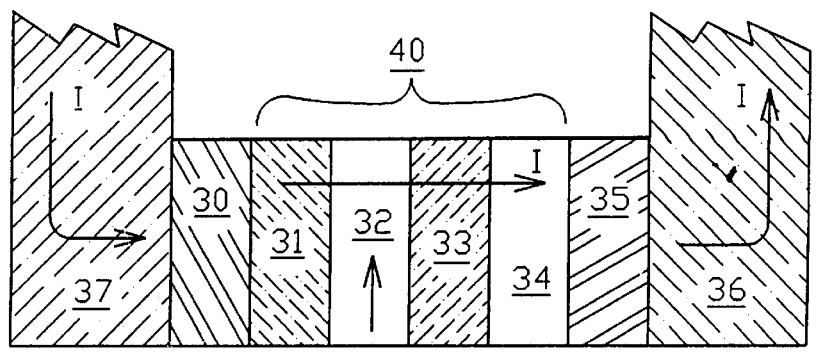
FIG. 4 is a cross-sectional view of the structure of a GMR sensor usable in the present invention.

FIG. 4 shows a representative GMR sensor employing a spin valve mechanism which may be employed in the present invention. The structure includes a pinning layer 31 of a suitable conductive material such as FeMn which functions to magnetically pin a ferromagnetic layer 32 of NiFe or Co. A spacer layer 33 of Cu, Au, Ag, Cr or other suitable transition metal or noble metal is located adjacent to pinned layer 32. A free magnetic layer 34 of NiFe or Co is positioned adjacent to the other side of spacer layer 33. Nonmagnetic, conductive layers 30, 35 are disposed adjacent to layers 31, 34, respectively. The elements of the GMR sensor, elements 31–34, are identified in FIG. 4 by reference numeral 40. A conductor layer 36 is located adjacent to conductive layer 34 and a conductor layer 37 is located adjacent to conductive layer 30. Layers 36, 37 carry sense current, whose direction is shown by the arrows, for providing an indication of the read signal detected by the sensor. The sensing current flows perpendicular to the elements 40 to produce operation in a current-perpendicular-to the-plane (CPP) mode. Conductor layers 36, 37 also act as magnetic shields for the GMR sensor.

Although the embodiment of FIG. 4 illustrates a GMR sensor utilizing a spin valve structure operating in a CPP mode, it will be understood that other configurations may be employed to practice the invention. Such other configurations include a spin valve GMR transducer operating in a current-in-the-plane (CIP) mode, a multilayer GMR transducer in either a CIP mode or a CPP mode, or other sensors which exhibit effects equivalent to GMR multi-layers such as tunneling junctions, spin transistors, or materials for colossal magnetoresistive (CMR) transducers and the like.

A fabrication procedure to obtain exact achievement of distance S may employ the application of a magnetic field to the structure and the detection of the response of the GMR sensor thereto, as described and claimed in the above-identified copending application Ser. No. 08/509,118.

An alternate technique for monitoring the recession depth during fabrication involves detecting the electrical resistance in the structure during lapping. By passing a current through a circuit which includes conductive shields 36, 37 and the electrically conductive lapping material disposed between the ends of these shields at the start of lapping, the change in resistance in this circuit as the ends of the shields and the lapping material are lapped away can be detected.

Figure 5:
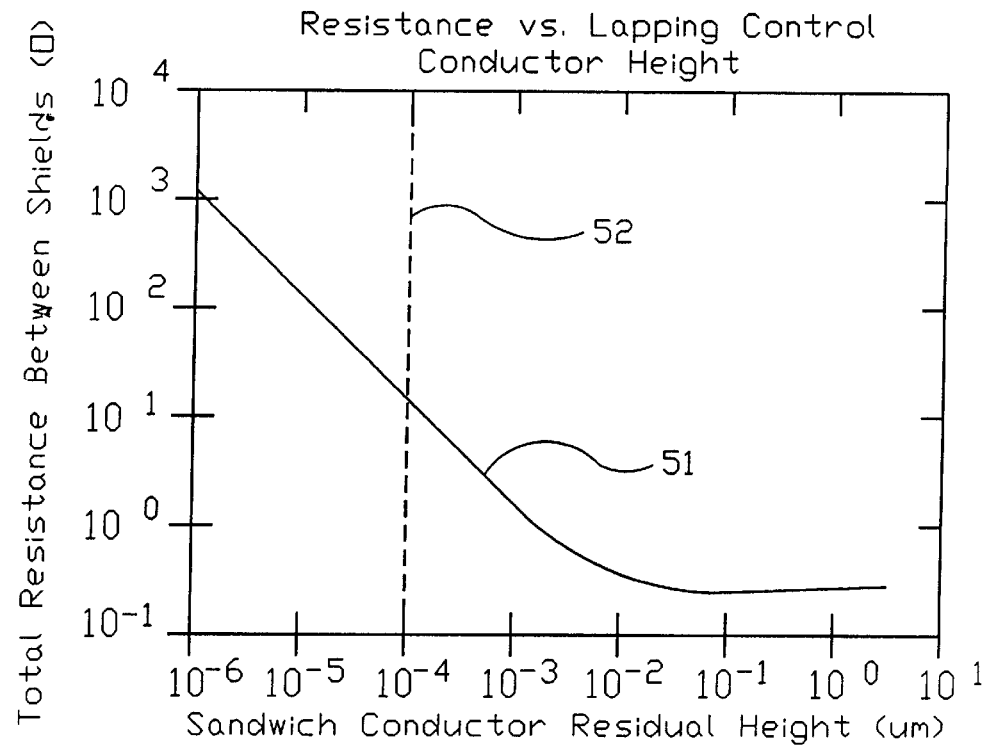
FIG. 5 is a graph showing the variation in resistance between the sensor shields as a function of the residual height of the lapping control conductor placed between the shields as the structure is lapped.

As shown in curve 51 in FIG. 5, as the residual height of the structure including the lapping monitor conductors (the "sandwich conductors") decreases during lapping, the sandwich resistance increases. The value of resistance corresponding to the desired height or recession depth S, represented for example by dotted line 52 at a height of $10^{-4}$ μm, can be determined and utilized as an indication as to when to terminate lapping. Using this technique, no lapping of the GMR element itself is required, thereby avoiding possible damage to the GMR sensor during this operation.

Figure 6:
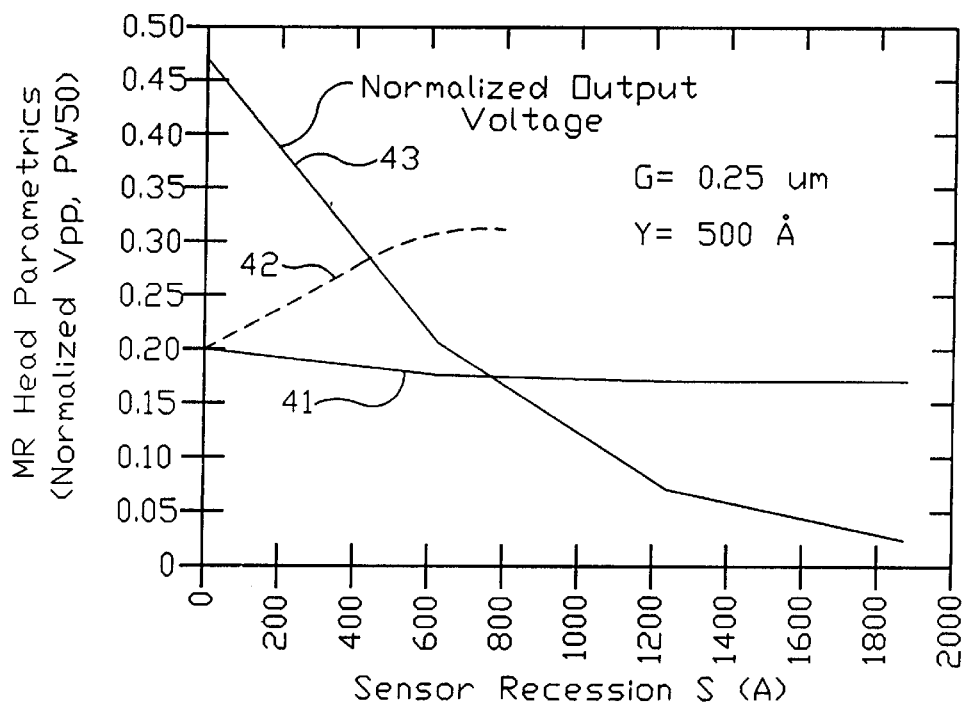
FIG. 6 is a graph showing variations in the $PW_{50}$ parameter as a function of the depth of the recession of the sensor from the air bearing surface of the transducer.

Detailed flux analysis and micromagnetic simulation of the present structure has been carried out. In FIG. 6, curve 43 represents the normalized output voltage at $PW_{50}$ as a function of the sensor recession S. Curve 42 is a plot of the expected variations in $PW_{50}$ versus increased spacing between the record surface and the sensing surface of the GMR (with no recession) element. The X-axis represents the ABS-to-record medium spacing minus 500°. For G=0.25 μm, (the shield-to-shield gap spacing) and a flying height (Y) of 500 A°, the $PW_{50}$ at S=0 (no recession) is 0.20 μm. Curve 42 indicates that it would be expected that the $PW_{50}$ would increase as the spacing between the record surface and the GMR sensor increases. However, as shown in curve 41, which is a graph of the calculated width of the output signal at 50% amplitude as a function of sensor recession, (with the ABS-to-recorded medium spacing Y fixed at 500 A° when S=G/4=625 Å, $PW_{50}$ reduces to 0.19 μm because the sensor effectively sees a smaller gap. This is contrary to the belief that increases in S increase the head-disk spacing and therefore increase $PW_{50}$. The signal loss at S=625 Å, shown in curve 43, compared to the loss at S=0, is about 50%.

When S=G/2=1250 Å, $PW_{50}$=0.17 μm, and curve 43 reduces to approximately 21% of that at S=0. With current GMR materials exhibiting a 2–5 times larger ΔR/R compared to regular MR sensors, this amount of signal loss can be readily compensated by proper choice of the ΔR/R of the GMR sensor. The decrease in $PW_{50}$ as S increases in accordance with this invention leads to higher flux changes per inch. Also, when S increases, the horizontal flux components that enter the sensor are substantially reduced. This leads to a more symmetric off-track profile as well as less cross-talk, which in turn contributes to a higher tracks per inch and an improved servo linearity.

What is claimed is:

1. A giant magnetoresistive transducer for reading data signals recorded on a surface of a magnetic medium, said transducer having an air bearing surface comprising:
    a giant magnetoresistive sensor having a sensing surface and side surfaces, said sensor being recessed at a distance S from said air bearing surface to define a gap between said sensor and said air bearing surface;
    magnetic shield members spaced from each of said side surfaces and at a distance G between said shield members wherein said distance S is less than half of said distance G for preventing signal loss caused by said shields shunting away incoming transition flux from said magnetic medium; and
    a dielectric layer disposed within said gap, said dielectric layer extending from said sensing surface to separate said sensing surface from said surface of said magnetic medium on which data signals are recorded which are to be read out by said transducer.

2. A transducer in accordance with claim 1 in which said giant magnetoresistive sensor comprises a spin valve structure.

3. A transducer in accordance with claim 1 in which S is between 500–1250 Å.

4. A transducer in accordance with claim 1 in which said giant magnetoresistive sensor comprises a multilayer structure.

5. A transducer in accordance with claim 1 in which said giant magnetoresistive sensor is made to operate in a current-perpendicular-to-the-plane mode.

6. a transducer in accordance with claim 1 in which said giant magnetoresistive sensor is made to operate in a current-in-the-plane mode.

* * * * *